United States Patent Office 3,333,771
Patented Aug. 1, 1967

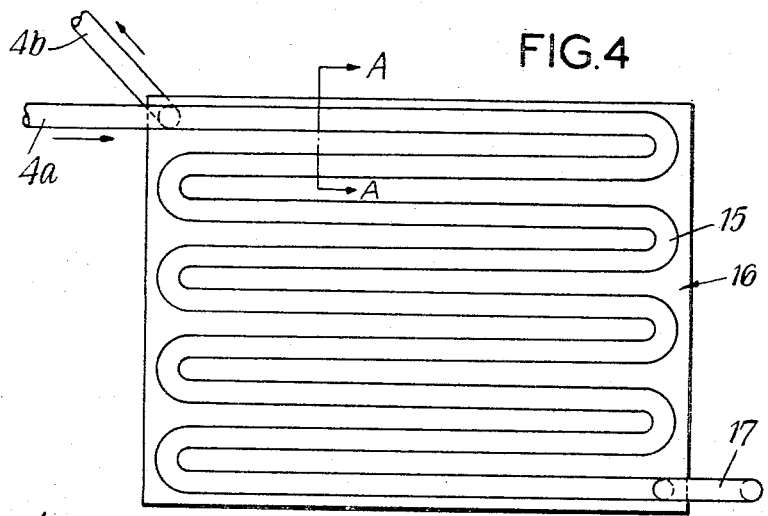
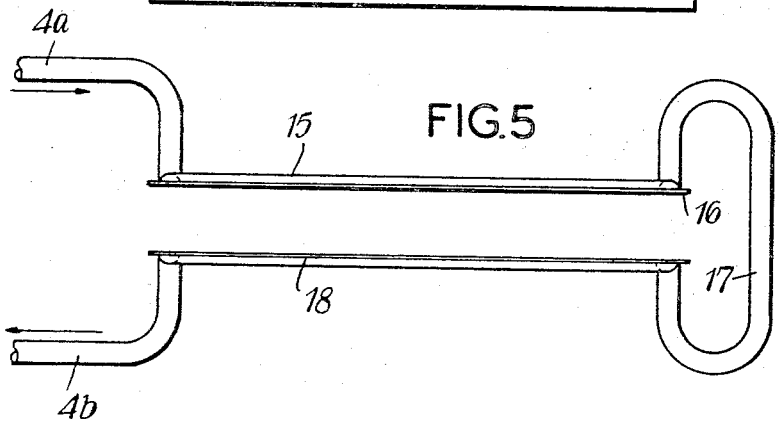
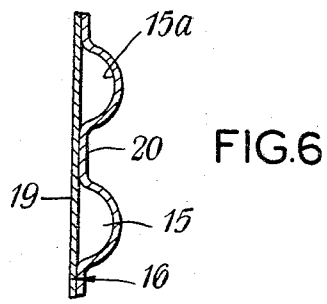

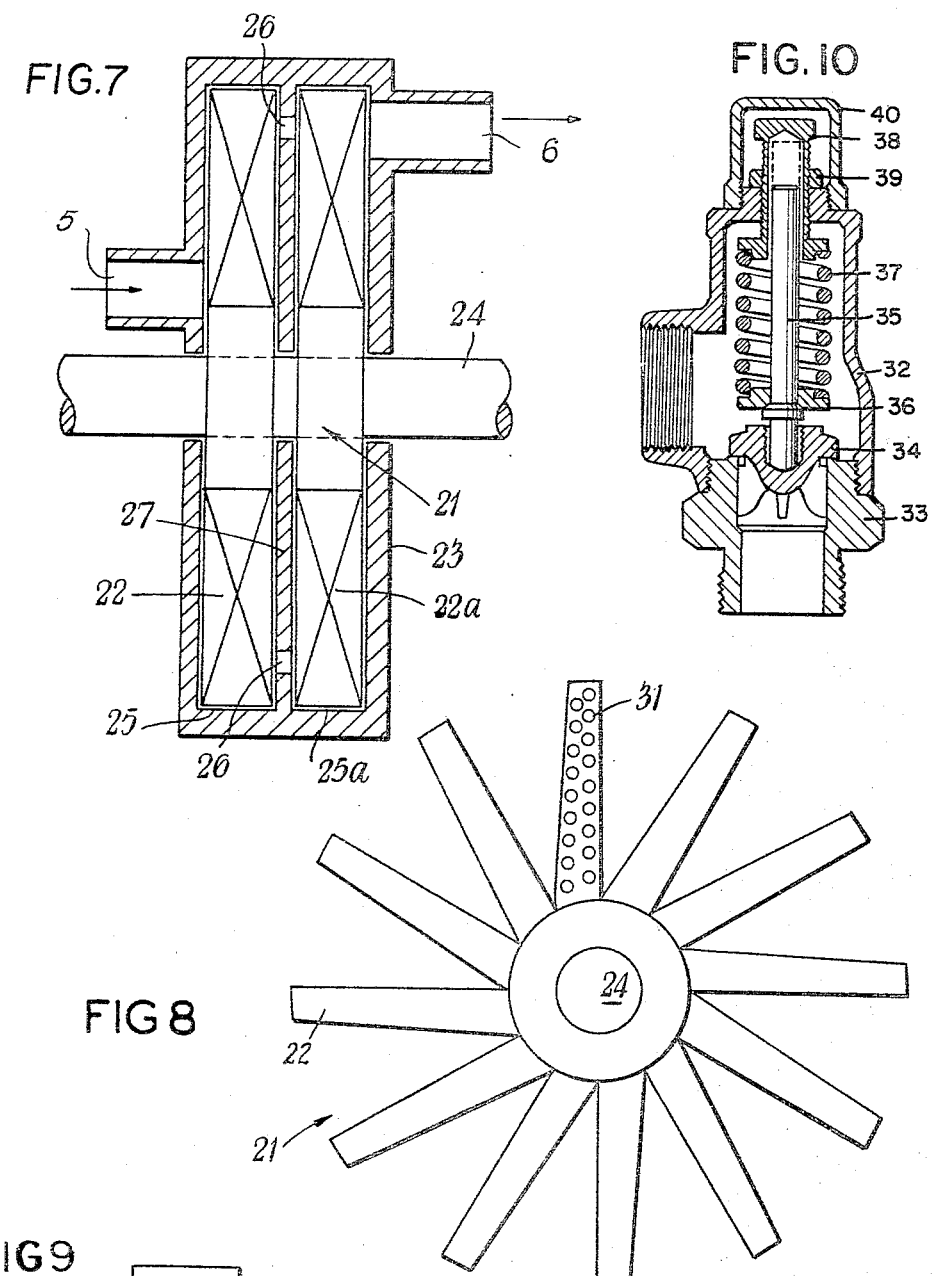
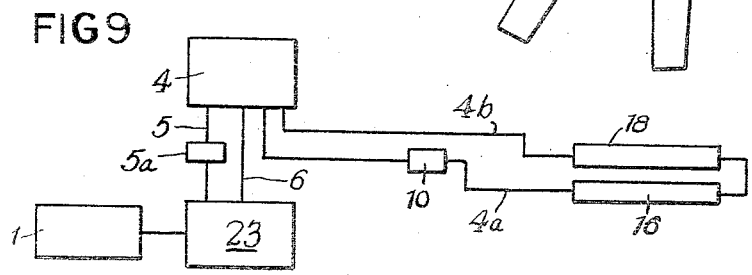

3,333,771
HEATING MEANS
Geoffrey Graham, Bradford, England, assignor to
Scandura Incorporated, Portland, Maine
Filed Sept. 14, 1964, Ser. No. 405,319
Claims priority, application Great Britain, Sept. 13, 1963,
36,156/63
4 Claims. (Cl. 237—1)

This invention relates to heat generating units for use in the vulcanising of belt joints in situations where stringent fire precautions are considered necessary, for example as in coal mines.

It is common practice in coal mines to convey the coal from the coal face to the pit shaft by means of endless belt conveyors. Through continual wear and abrasion, sections of the belting on the conveyor become damaged and have to be cut out and replaced by new lengths of belting which are incorporated in the conveyor by means of belt joints. These joints are frequently in the form of a vulcanised splice.

The two belt ends to be spliced are first notched or otherwise serrated and coated with a bonding compound. The joint is effected by placing the two belt ends together between heated metal plates or platens and allowing the bonding compound to cure through the application of heat. It is essential when making a belt joint in a coal mine, that any heat developed for the splicing operation must be obtained without the fear of sparks or naked flames being emitted.

Heretofore the platens have generally been heated by means of electric filaments embedded therein. Current for the filaments has been supplied by an electric transformer. However, in practice it has been found that the apparatus required for this type of heating is very heavy and cumbersome since it normally involves numerous special flame-proof units for the transformers, switchgear, thermostats and junction boxes between these units in order to render them flameproof.

It is therefore an object of the present invention to provide an improved heat generating unit for use in the vulcanising of belt joints under conditions of high explosion and fire risk.

It is a further object of the present invention to provide a heat generating unit which incorporates working chamber means which is completely flameproof.

It is a still further object of the present invention to provide a portable belt vulcanising unit which is flameproof and is far lighter and easier to handle than flameproof belt vulcanising units which have hitherto been proposed.

According to the present invention there is provided a portable, belt vulcanising unit which includes a closed heating liquid circuit, circulating pump means in said circuit adapted to pump said heating liquid through and round said circuit, energy conversion means in said circuit for converting mechanical energy into thermal energy adapted to effect an increase in temperature of said heating liquid, and belt vulcanising platen means in said circuit adapted to be heated by said heating liquid.

A heat generating unit incorporating the principle of conversion of mechanical energy into thermal energy is well known; United States Patent 2,764,147 discloses a frictional heater for a hydraulic system which works on the above principle. In one form, the means for converting mechanical energy into thermal energy is a rotatable member capable of providing relative movement between itself and the heating liquid. The rotatable member, like the circulating pump can be driven by a flameproof electric motor which is well known in the art. It will be realised however that other flameproof driving means may be used, for the operation of either or both the pump and rotatable member, for example a compressed air operated motor.

The invention further provides for a pair of metal platens between which the belt joint is placed during the vulcanisation process. Each platen consists of a metal plate which is embossed on its under surface with a series of continuous grooves. A second metal plate is then welded onto the under surface thus providing a series of internal passageways between the two plates. Inlet and outlet pipes are provided on the sides of the platen to allow the heating liquid to circulate through the internal passageways.

In the present form of the invention for the conversion of mechanical energy into thermal energy for use in the heat generating unit, heating liquid is passed to a liquid chamber via the small inlet orifice by the circulatory action of the vanes in the rotor chamber. From the liquid chamber the heated heating liquid is pumped into the platen or platens by means of a small centrifugal pump. The arrangement is such that continual circulation of the heating liquid through the rotor chamber and then through the small inlet orifice into the liquid chamber and thence into the platen or platens causes a proportion of the mechanical energy of the heating liquid to be transformed to thermal energy and a consequential rise in the temperature of the heating liquid.

One embodiment of the present invention will now be described by way of example only, and with reference to the accompanying diagrammatic drawings in which:

FIG. 4 illustrates a platen and shows the arrangement of the internal passageways through the platen;

FIG. 5 illustrates the way in which the internal passageways of two platens are coupled;

FIG. 6 shows a cross-section on the lines A—A of FIG. 4 and illustrates a suitable form of construction of a platen;

FIG. 7 shows a rotor situated within the rotor chamber shown in FIG. 1 for converting mechanical energy of the rotor into thermal energy to effect an increase in temperature of the heating liquid; and FIG. 8 is a side view of the vanes of the rotor illustrated in FIG. 7.

Figure 1:
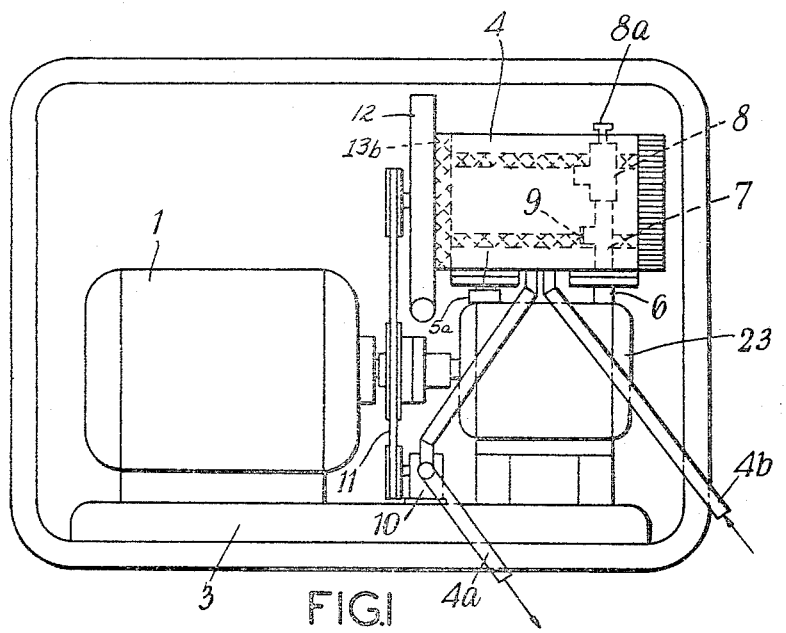
FIG. 1 illustrates a heating liquid heating unit which includes the restricted orifice, the liquid chamber, and rotor chamber and pipes therefrom through which heating liquid can pass to platens (to be connected thereto)
Figure 2:
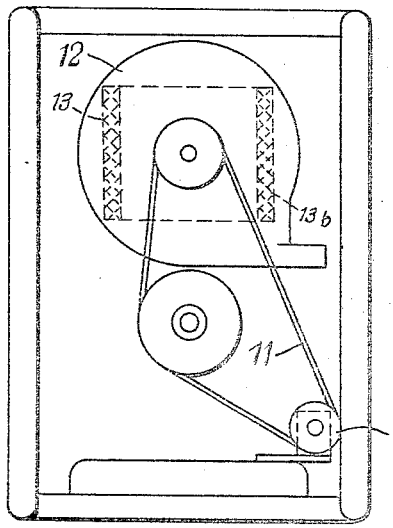
FIG. 2 is an end elevation of the unit illustrated in FIG. 1.

A flameproof electric motor 1 (see FIG. 1) is directly coupled to a rotor housed in a rotor chamber 23 (to be described hereinafter with reference to FIGS. 7 and 8); both the motor 1 and rotor chamber 23 are mounted on a common base plate 3. A liquid chamber 4 is mounted on the flanges of inlet and outlet passages 5 and 6 respectively of the rotor chamber 23.

Inside the liquid chamber 4 a pipe 7 extends from the outlet 6 of the rotor chamber 23 to a variable pressure relief valve 8 which valve is adjusted by a handle 8a. The pipe 7 includes a small fixed orifice 9 connected in parallel with the relief valve 8 through which orifice liquid can flow independently of the setting of the relief valve 8. The discharge of liquid from the relief valve 8 and the orifice 9 is confined to the liquid chamber 4.

The liquid in the liquid chamber 4 is circulated through pipe 4a to the platen or platens (to be described herein after with reference to FIGS. 4 to 6) and the pipe 4b by means of a small centrifugal pump 10 driven by a belt 11 from the electric motor 1.

Figure 3:
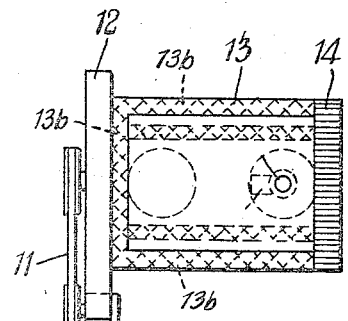
FIG. 3 is a plan view of the liquid chamber shown in FIG. 1 and illustrates an air jacket enclosing said chamber.

Also driven through the belt 11, by the electric motor 1, is a centrifugal air blower 12 which is operatively associated with an air jacket 13 that surrounds the liquid chamber 4 (see FIG. 3). The blower 12 draws air through a filter 14 such that the air passes around, and in contact with, the liquid chamber 4 where it becomes heated and the heated air used to dry the ends of a belt before splicing commences.

In combination with the air jacket 13 there is provided a plurality of passageways 13a situated within the liquid chamber itself. Air is caused to pass through the passageways 13a by use of the blower 12. In operation, once the liquid chamber becomes hot, air can be passed through it and the heated air used for example, to dry the ends of a belt to be joined by vulcanising prior to such vulcanisation.

In order to obtain an efficient transfer of heat from the liquid chamber to the air in the air jacket 13 and in the air passageways 13a, the passageways and the air jacket 13 are tightly packed with knitted copper wire 13b.

Referring now to FIGS. 4 to 6, which illustrate the platens for vulcanising a belt joint; the heating liquid passes through inlet pipe 4a to a duct 15 associated with a platen 16. The heating liquid flows through the duct 15 and consequently transfers its heat to the platen 16. The heating liquid eventually passes via connecting pipe 17 to a further platen 18 which is similarly heated. The heating liquid can eventually return through the pipe 4b to the heating unit to be reheated.

FIG. 6 illustrates a convenient way in which the duct 15 can be provided in the platen 16 by the liquid-tight connection of a flat metallic sheet 19 and a suitably shaped metallic sheet 20, shaped for example by pressing, to provide a channel 15a. The two sheets 19 and 20 can be conveniently joined by welding.

Referring now to FIGS. 7 and 8 which illustrate rotor means for heating the heating liquid; a rotor 21 having two sets of vanes 22 and 22a is rotatably mounted within the rotor chamber 23 on a rotor shaft 24 which is coupled to the motor 1. The rotor chamber 23 is sub-divided into two vane chambers 25 and 25a in which are respectively housed the sets of vanes 22 and 22a. The vane chambers 25 and 25a are interconnected by a plurality of passages 26 radially disposed about the longitudinal axis of the shaft 24 to pass through a partition wall 27 which separates the two housings 25 and 25a. The rotor chamber 23 is provided with the inlet passage 5 through which liquid can pass from the liquid chamber 4 into the vane housing 25 and the outlet passage 6 through which liquid can pass from the vane housing 25a to the liquid chamber 4.

The vanes 22 and 22a of the rotor 21 are suitably shaped and, if desired, perforated as at 31 to provide an efficient rate of heating to liquid flowing through the housings 25 and 25a when the rotor 21 is rotated therein. It will be realised that the moving vanes provide, in addition to the property of raising the temperature of the liquid, an efficient pump for circulating the heating liquid round the liquid circuit and if necessary this pumping action can replace the small centrifugal pump 10.

Inserted in the inlet passage 5 of the rotor chamber 23 a liquid flow control valve 5a adjustment of which valve provides an efficient method of controlling the flow of heating liquid from the liquid chamber 4 to the rotor chamber 23.

In operation of the heat generating unit as above described and illustrated with reference to FIGS. 1 to 3, and 8 the supply and return pipes 4a and 4b are coupled to the pair of platens illustrated in FIG. 5; the flameproof electric motor 1 is turned on and the centrifugal rotor 21 rotates in its housing. Heating liquid is drawn from the liquid chamber 4 by the pumping effect of the rotor 21, passes through the valve 5a, inlet 5 and rotor housing 23 from which it is eventually discharged via the outlet 6 and through the small fixed orifice 9 (and if desired the variable relief valve 8) and back into the liquid chamber. The continual circulation of the liquid through the small fixed orifice 9 and the rotation of the rotor 21 in its housing 23 causes work to be done on the liquid and a consequent increase in its temperature. The temperature of the liquid continues to rise until eventually it boils and in this respect the unit can be self regulating with regard to temperature. The heated heating liquid in the liquid chamber 4 is drawn through the liquid supply pipe 4a by the small centrifugal supply pump 10 and passes through the platens 16 and 18 as previously described to cause them to be heated. The liquid eventually returns through pipe 4b to the liquid chamber 4 where it passes through the process of reheating. The heated platens can then be utilised for vulcanising belt joints by a method well known in the art.

By suitable adjustment of the flow control valve 5a and of the variable relief valve 8, sensitive control on the temperature of the heating liquid can be obtained.

When the heating liquid is such that it does not emit a harmful or objectionable vapour then the liquid chamber 4 may be vented for the purpose of releasing this vapour; the inclusion of this vent is especially advantageous in the case when excess power supplied by the electric motor is dissipated as a vapour in the liquid chamber.

During the initial heating up period of the liquid and in order to obtain the maximum rate of temperature rise, the relief valve 8 is screwed fully closed thus causing all the liquid delivered from the pump to pass through the small fixed orifice 9. As would be expected the working characteristics of the rotor used are such that the maximum pressure developed under operational conditions is well within the bursting strength of the rotor housing, similarly the electric motor 1 is such that it does not become overloaded on the maximum working stresses.

It will be seen that since liquid is utilised as the heating medium the boiling point of the liquid can be chosen to suit a particular belting material in which a joint is to be vulcanised. For example, in the making of vulcanised joints for belting according to British patent specification No. 901,197 a temperature of 100° C. is required and water is thus suitable to use. Conversely ethyleneglycol may be added to the water in which case the boiling point is raised to 120° C. or more depending upon the ratio of ethyleneglycol to water, and it is usually this mixture which is preferred for temperatures in the region of 100 to 120° C. If higher temperatures still are required, liquids of higher boiling point may be used, and if their vapours are harmful or objectionable, as is usually the case, the vent from the liquid chamber would be connected to a suitable reflux condenser.

It is to be noted that the maximum temperature obtainable in the heating unit is controlled by the boiling point of the liquid used, but alternatively normal thermostatic control may be utilised. Preferably a non-electric type would be used, for example an expanding capsule operating a relief valve. This arrangement would permit the use of non-inflammable and innocuous liquids, for example, glycerine, at temperatures below the level of the boiling points.

I claim:

1. A portable, belt vulcanising unit which includes a closed heating liquid circuit, circulating pump means in said circuit adapted to pump said heating liquid through and round said circuit, energy conversion means in said circuit for converting mechanical energy into thermal energy adapted to effect an increase in temperature of said heating liquid, and belt vulcanising platen means in said circuit adapted to be heated by said heating liquid.

2. A belt vulcanizing unit which includes a closed heating liquid circuit, a heat producing restrictor in said circuit, a rotor chamber in said circuit, a heat producing vaned rotor housed in said rotor chamber, driving means for imparting rotational movement to said rotor, and belt vulcanizing platen means in said circuit.

3. A belt vulvanizing unit according to claim 2 wherein said heat producing restrictor defines an inlet orifice to a liquid chamber in said circuit.

4. A belt vulcanizing unit according to claim 3 wherein said circuit includes an adjustable, by-pass, relief valve connected in said circuit in parallel with said restrictor to communicate with said liquid chamber whereby adjustment of said relief valve can cause heating liquid flowing into said liquid chamber to by-pass said restrictor.

References Cited
UNITED STATES PATENTS

| | | | |
|---|---|---|---|
| 352,874 | 11/1886 | Johnson | 237—9 |
| 539,145 | 5/1895 | Robins | 156—137 |
| 1,031,489 | 7/1912 | Thomson | 122—26 |
| 1,130,720 | 3/1915 | Ewers | 156—583 X |
| 1,682,102 | 8/1928 | Allen | 126—247 |
| 1,758,207 | 5/1930 | Walker | 122—26 |
| 1,809,654 | 6/1931 | Wagner | 165—162 |
| 1,833,130 | 11/1931 | Roe | 110—56 |
| 2,105,191 | 1/1938 | Kenney | 122—26 X |
| 2,764,147 | 9/1956 | Brunner | 126—247 |
| 2,882,023 | 4/1959 | Rizzo | 165—121 X |
| 3,047,055 | 7/1962 | Kimm | 126—247 X |

ROBERT A. O'LEARY, *Primary Examiner.*

A. W. DAVIS, *Assistant Examiner.*